United States Patent
Chen

(10) Patent No.: US 9,871,453 B2
(45) Date of Patent: Jan. 16, 2018

(54) CONTROL CIRCUIT AND METHOD OF A POWER CONVERTER

(71) Applicant: Richtek Technology Corporation, Zhubei, Hsinchu County (TW)

(72) Inventor: Isaac Y. Chen, Jubei (TW)

(73) Assignee: Richtek Technology Corp., Zhubei, Hsinchu County (TW)

( * ) Notice: Subject to any disclaimer, the term of this patent is extended or adjusted under 35 U.S.C. 154(b) by 19 days.

(21) Appl. No.: 15/267,487

(22) Filed: Sep. 16, 2016

(65) Prior Publication Data

US 2017/0005579 A1 Jan. 5, 2017

Related U.S. Application Data

(62) Division of application No. 14/695,761, filed on Apr. 24, 2015, now Pat. No. 9,654,011.

(51) Int. Cl.
| | |
|---|---|
| *H02M 3/335* | (2006.01) |
| *H02H 3/027* | (2006.01) |
| *H02H 7/12* | (2006.01) |
| *H02M 1/00* | (2006.01) |
| *H02M 1/32* | (2007.01) |

(52) U.S. Cl.
CPC ........ *H02M 3/33507* (2013.01); *H02H 3/027* (2013.01); *H02H 7/1213* (2013.01); *H02M 3/33523* (2013.01); *H02M 2001/0032* (2013.01); *H02M 2001/325* (2013.01); *Y02B 70/16* (2013.01)

(58) Field of Classification Search
CPC ............... H02M 1/32; H02M 3/33507; H02M 3/33523; H02M 2001/0009; H02M 2001/0032; H02M 2001/325
See application file for complete search history.

(56) References Cited

U.S. PATENT DOCUMENTS

| | | | | |
|---|---|---|---|---|
| 5,661,780 | A * | 8/1997 | Yamamoto | H04M 1/73 455/573 |
| 7,133,300 | B1 * | 11/2006 | Yang | H02H 7/122 323/284 |
| 7,486,493 | B2 | 2/2009 | Yang | |
| 7,760,478 | B2 * | 7/2010 | Yang | H02M 1/32 361/93.1 |
| 2006/0227476 | A1 * | 10/2006 | Yang | H02M 3/33507 361/90 |
| 2008/0088284 | A1 * | 4/2008 | Weng | H02M 3/1563 323/271 |

(Continued)

*Primary Examiner* — Yusef Ahmed
(74) *Attorney, Agent, or Firm* — Muncy, Geissler, Olds & Lowe, P.C.

(57) ABSTRACT

A feedback signal stabilized by a capacitor and related to an output voltage of a power converter is used to acquire the output power information of the power converter, and a control circuit uses a second clock not related to the switching frequency of the power converter to count a duration time of the feedback signal being higher than a threshold. When the duration time is higher than a preset time, an abnormal output power of the power converter is distinguished and the power converter will be turned off. The feedback signal will not vary severely even if the output terminal of the power converter is interfered, and the counted duration time will not be influenced when the switching frequency is changing caused by a load changing.

8 Claims, 9 Drawing Sheets

(56) References Cited

U.S. PATENT DOCUMENTS

| | | | | |
|---|---|---|---|---|
| 2008/0298095 A1* | 12/2008 | Chuang | H02M 3/33523 | 363/21.12 |
| 2010/0008110 A1* | 1/2010 | Huang | H02M 3/33523 | 363/21.18 |
| 2012/0133348 A1* | 5/2012 | Fan | H02M 3/1588 | 323/284 |
| 2013/0063112 A1* | 3/2013 | Yang | H02M 1/32 | 323/282 |
| 2013/0070379 A1* | 3/2013 | Pan | H02H 3/006 | 361/87 |
| 2013/0088206 A1* | 4/2013 | Tsou | H02M 3/33507 | 323/234 |
| 2013/0147440 A1* | 6/2013 | Shiroyama | G01R 31/40 | 320/166 |
| 2014/0063865 A1* | 3/2014 | Nate | H02M 3/33507 | 363/21.13 |
| 2014/0146581 A1* | 5/2014 | Tsou | H02M 3/33507 | 363/21.18 |
| 2014/0177290 A1* | 6/2014 | Zhang | H02M 3/33507 | 363/21.13 |
| 2014/0247523 A1* | 9/2014 | Kawano | H02H 9/02 | 361/18 |
| 2015/0084606 A1* | 3/2015 | Nakamura | H02M 3/156 | 323/246 |
| 2015/0160287 A1* | 6/2015 | Huang | H02H 3/24 | 324/537 |
| 2015/0357924 A1* | 12/2015 | Lin | H02M 3/33507 | 363/21.18 |
| 2016/0043645 A1* | 2/2016 | Chu | H02M 3/33507 | 363/21.01 |
| 2016/0069938 A1* | 3/2016 | Wu | G01R 19/165 | 361/18 |
| 2016/0099648 A1* | 4/2016 | Chu | H02M 3/33507 | 363/21.01 |
| 2016/0172999 A1* | 6/2016 | Fogg | H02M 3/1588 | 363/53 |
| 2016/0241150 A1* | 8/2016 | Hsu | H02M 3/33523 | |
| 2016/0268907 A1* | 9/2016 | Chen | H02M 3/33507 | |

\* cited by examiner

CONTROL CIRCUIT AND METHOD OF A POWER CONVERTER

CROSS-REFERENCE TO RELATED APPLICATIONS

The present application is a Divisional of co-pending application Ser. No. 14/695,761, filed 24 Apr. 2015, for which priority is claimed under 35 U.S.C. §120, the entire content of which is hereby incorporated by reference.

FIELD OF THE INVENTION

The present invention is related generally to a control circuit and a control method of a power converter and, more particularly, to control of a peak load system.

BACKGROUND OF THE INVENTION

In peak load systems such as printers and point-of-sale (POS) systems, an output power Po of a power converter rises suddenly to form a surge in time of operation as shown by the waveform in FIG. 1. Thus, a proper protecting mechanism is needed to determine whether the surge is normal or is resulted from the abnormal output power. A conventional determining method for the abnormal output power is to observe whether a duration time of the surge is over a preset value (about 100 ms-1 s).

U.S. Pat. No. 7,486,493 discloses a method for determining whether the output power of a power converter is abnormal or not. FIG. 2 shows the operation of this art, in which two thresholds VT1 and VT2 are preferably set, a sensing signal VCS related to the current flowing through a power switch at the primary side of a transformer is utilized to determine the output power Po, and the first threshold VT1 is used for limiting the maximum of the output power Po. When the sensing signal VCS equals to or higher than the first threshold VT1 as shown at time t3, it means that an output short occurs, and the power converter will be turned off right away. When the sensing signal VCS is higher than the second threshold VT2 and lower than the first threshold VT1 as shown at time t1 to time t2, a timer starts counting. If the duration time Ts of the sensing signal VCS that is higher than the second threshold VT2 is lower than a preset time Tth, it means that the output power Po of the power converter is normal. Oppositely, if the duration time Ts equals to or higher than the preset time Tth, it means that the output power Po of the power converter is abnormal, and the power converter is to be turned off.

However, the aforementioned art utilizes a same clock to generate a driving signal for controlling the power switch and count the duration time Ts that the sensing signal VCS is higher than the first threshold VT1. When the power converter enters a light-load mode, it needs to decrease the frequency of the clock for lowering the switching times of the power switch in order to lessen the switching loss. However, afore operation cannot count the duration time Ts correctly because the timer usually employs pulsed quantity of the clock to determine the time. If the period of the clock is 1 ms and the preset time Tth is 100 ms under a heavy-load mode, the timer is set for determining an abnormal output power while the 100th pulse is counted. However, in time of the light-load mode, the period of the clock becomes 2 ms. Accordingly, the timer counts the fiftieth pulse under the light-load mode, but the actual duration time Ts is over the preset time Tth. Nonetheless, the timer does not determine an abnormal output power until it counts the 100th pulse. As a result, the power converter cannot be turned off in time, which results in a damaged power converter. Moreover, the sensing signal VCS responds to the output power in real time. Namely, in time of counting the duration time Ts, the timer counts the time Ts again if the output terminal of the power converter is interfered, the output power Po varies severely such that the sensing signal VCS drops below the second threshold VT2 in seconds as shown at time t4. Thereby, the power converter is not turned off at time t5 but delayed until time t6, which easily causes the damaged power converter.

Today, there are methods that the sensing signal VCS will not be easily interfered by the transient of the output power. For example, the datasheet UCC 28630 discloses that an average of the sensing signal VCS is acquired, so that the interference of the transient of the output will not affect the average thereof easily. But it should be noted that all the present methods require a complicated circuitry.

SUMMARY OF THE INVENTION

An objective of the present invention is to provide a control circuit and a control method for determining an abnormal output power of a power converter in time of a light-load mode.

Another objective of the present invention is to provide a control circuit and a control method that will not be influenced by an interference of a transient variation of the output power in time of determining the abnormal output power.

According to the present invention, a control circuit of a power converter comprises a switch circuit, a first comparator, and an overpower protecting circuit. The switch circuit generates a driving signal to switch a power switch so as to modulate an output voltage. The switch circuit includes a first oscillator that provides a first clock to determine the frequency of the driving signal. The first comparator compares a feedback signal with a first threshold. When the feedback signal is higher than the first threshold, a first off-signal is generated to the switch circuit so as to turn off the power converter. The feedback signal is generated by a first capacitor according to a signal related to the output voltage of the power converter. The overpower protecting circuit includes a second comparator for comparing the feedback signal with a second threshold and a timer for counting a duration time of the feedback signal being higher than the second threshold. When the duration time is higher than a preset time, the timer generates a second off-signal to the switch circuit so as to turn off the power converter. The present invention utilizes the feedback signal provided by the first capacitor to detect the output power of the power converter. The first capacitor is capable of stablizing a voltage, so even if the output terminal of the power converter is interfered, the feedback signal will not vary severely. Thus, the abnormal output power can be accurately distinguished.

In one embodiment, the timer includes a second oscillator for generating a second clock and a counter acquiring a counting value according to the duration time counted by the second clock. When the counting value is higher than a preset value, the counter generates the second off-signal. In this embodiment, the second clock that counts the duration time is not related to the first clock that determines a switching frequency of the power switch. Thus, when the frequency of the first clock varies response to a load change, the second clock is not affected. As a result, the duration time can be accurately counted.

In a further embodiment, the timer includes a second capacitor, a first current source, a first switch connected between the second capacitor and the first current source and controlled by an output of the second comparator, a second current source, a second switch connected between the second capacitor and the second current source and controlled by the output of the second comparator, and a hysteresis comparator connected to the second capacitor for comparing a voltage of the second capacitor with a preset value. When the voltage of the second capacitor is higher than the preset value, the hysteresis comparator generates a second off-signal. When the first switch is turned on, the first current source charges the second capacitor. When the second switch is turned on, the second current source discharges the second capacitor.

According to the present invention, a control method of a power converter comprises the steps of providing a first clock to determine a frequency of a driving signal; switching a power switch according to the driving signal so as to modulate an output voltage; comparing a feedback signal with a first threshold and generating a first off-signal when the feedback signal is higher than the first threshold so as to turn off the power converter; and comparing the feedback signal with a second threshold and generating a second off-signal for turning off the power converter when a duration time that the feedback signal is higher than the second threshold is higher than a preset time. The feedback signal is generated by the first capacitor according to a signal related to the output level of the power converter. The present invention utilizes the feedback signal provided by the first capacitor to detect the output power of the power converter. Due to the first capacitor is capable of stablizing a voltage, the feedback signal will not be affected even if the output terminal of the power converter is interfered. Accordingly, an abnormal output power can be accurately distinguished.

In one embodiment, the step of generating the second off-signal includes generating a second clock; acquiring a counting value according to the second clock counting the duration time; and generating the second off-signal when the counting value is higher than a preset value. In this embodiment, the second clock that counts the duration time is not related to the first clock that determines the switching frequency of the power switch. Thus, when a load change varies the frequency of the first clock, the second clock will not be affected. Accordingly, the duration time can be accurately counted.

In another embodiment, the step of generating the second off-signal includes charging a second capacitor when the feedback signal is higher than the second threshold; discharging the second capacitor when the feedback signal is lower than the second threshold; and generating the second off-signal when a voltage of the second capacitor is higher than a preset value.

According to the present invention, a control circuit of a power converter comprises a switch circuit, a first comparator, and an overpower protecting circuit. The switch circuit generates a driving signal to switch a power switch so as to modulate an output voltage of the power converter. The switch circuit includes a first oscillator providing a first clock to determine the frequency of the driving signal. The first comparator compares a sensing signal related to a current that flows through the power switch with a first threshold. When the sensing signal is higher than the first threshold, a first off-signal is generated to the switch circuit so as to turn off the power converter. The overpower protecting circuit includes a second comparator comparing the sensing signal with a second threshold, and a timer counts a duration time of the sensing signal being higher than the second threshold according to a second clock that is not related to the first clock. When the duration time is higher than a preset time, the timer generates a second off-signal to the switch circuit so as to turn off the power converter. The second clock that counts the duration time is not related to the first clock that determines a switching frequency of the power switch. Thereby, the second clock will not be affected while a load change varies the frequency of the first clock. Thus, the duration time can be counted accurately.

According to the present invention, a control method of a power converter comprises the steps of providing a first clock to determine a frequency of a driving signal and switching a power switch according to the driving signal so as to modulate an output voltage of the power converter; comparing a sensing signal related to a current that flows through the power switch with a first threshold and generating a first off-signal when the sensing signal is higher than the first threshold so as to turn off the power converter; providing a second clock that is not related to the first clock; and counting a duration time of the sensing signal being higher than the second threshold according to the second clock, and generating a second off-signal to turn off the power converter when the duration time is higher than a preset time. The second clock that counts the duration time is not related to the first clock that determines the switching frequency of the power switch. Thus, when a load change varies the frequency of the first clock, the second clock will not be affected, so that the duration time can be accurately counted.

According to the present invention, a control circuit of a power converter comprises a switch circuit, a first comparator, and an overpower protecting circuit. The switch circuit generates a driving signal to switch a power switch so as to modulate an output voltage of the power converter. The first comparator is connected to the switch circuit for comparing a sensing signal related to a current that flows through the power switch with a first threshold. When the sensing signal is higher than the first threshold, a first off-signal is generated to the switch circuit so as to turn off the power converter. The overpower protecting circuit includes a second comparator for comparing the sensing signal with a second threshold, and a timer connected to the second comparator for counting a duration time of the sensing signal being higher than the second threshold. When the duration time is higher than a preset time, the timer generates a second off-signal to the switch circuit so as to turn off the power converter. The timer includes a second capacitor, a first current source, a first switch connected between the second capacitor and the first current source and controlled by an output of the second comparator. When the first switch is turned on, the first current source charges the second capacitor. The timer also includes a second current source, a second switch connected between the second capacitor and the second current source and controlled by the output of the second comparator. When the second switch is turned on, the second current source discharges the second capacitor. The timer further includes a hysteresis comparator connected to the second capacitor for comparing a voltage of the second capacitor with a preset value. When the voltage of the second capacitor is higher than the preset value, the hysteresis comparator generates the second off-signal.

According to the present invention, a control method of a power converter comprising the steps of providing a first clock for determining a frequency of a driving signal and switching a power switch according to the driving signal so as to modulate an output voltage of the power converter; comparing a sensing signal related to a current that flows through the power switch with a first threshold and generating a first off-signal when the sensing signal being higher than the first threshold so as to turn off the power converter; providing a second clock that is not related to the first clock; and comparing the sensing signal with a second threshold, counting a duration time of the sensing signal being higher than the second threshold according to the second clock, and generating a second off-signal when the duration time being higher than a preset time. The step of generating a second off-signal includes charging a second capacitor when the sensing signal being higher than the second threshold; discharging the second capacitor when the sensing signal being lower than the second threshold; and generating the second off-signal when a voltage of the second capacitor being larger than a preset value.

BRIEF DESCRIPTION OF THE DRAWINGS

These and other objectives, features and advantages of the present invention will become apparent to those skilled in the art upon consideration of the following description of the preferred embodiments according to the present invention taken in conjunction with the accompanying drawings, in which.

DETAILED DESCRIPTION OF THE INVENTION

Figure 3:
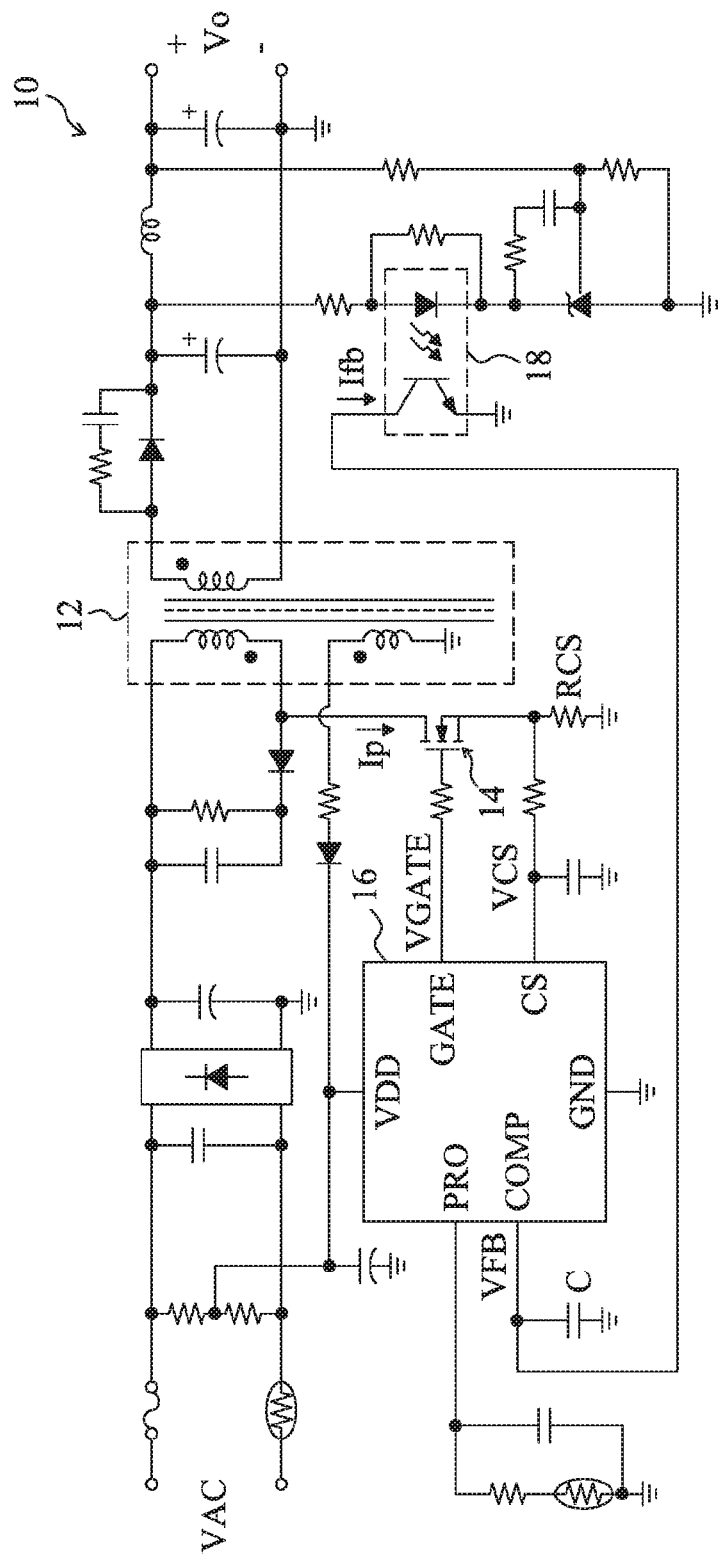
FIG. 3 shows an off-line power converter.

FIG. 3 shows an off-line power converter 10, which comprises a power switch 14 connected between a primary coil of a transformer 12 and a sensing resistor RCS, and a control terminal GATE of a control circuit 16 provides a driving signal VGATE to switch the power switch 14 so as to modulate an output voltage Vo of the power converter 10. The sensing resistor RCS detects the current Ip that flows through the power switch 14 so as to acquire a sensing signal VCS related to the current Ip, thereby providing the sensing signal VCS to a sensing terminal CS of the control circuit 16. An optical coupler 18 is connected to an output terminal of the power converter 10 for providing a signal Ifb related to the output voltage Vo to a capacitor C so as to generate a feedback signal VFB to a feedback terminal COMP of the control circuit 16. The control circuit 16 determines the driving signal VGATE according to the feedback signal VFB and the sensing signal VCS.

Figure 4:
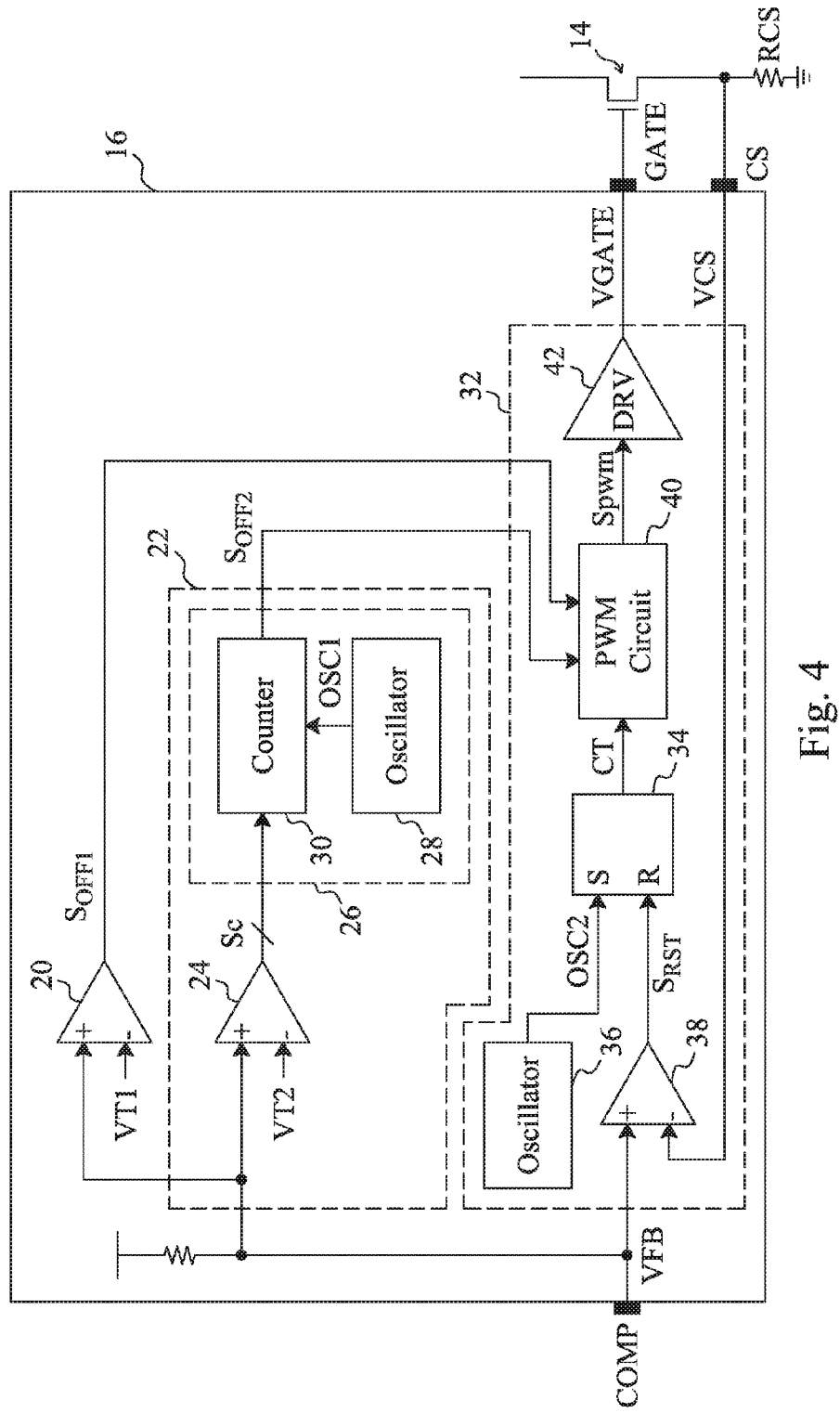
FIG. 4 shows a first embodiment of a control circuit of the present invention.
Figure 5:
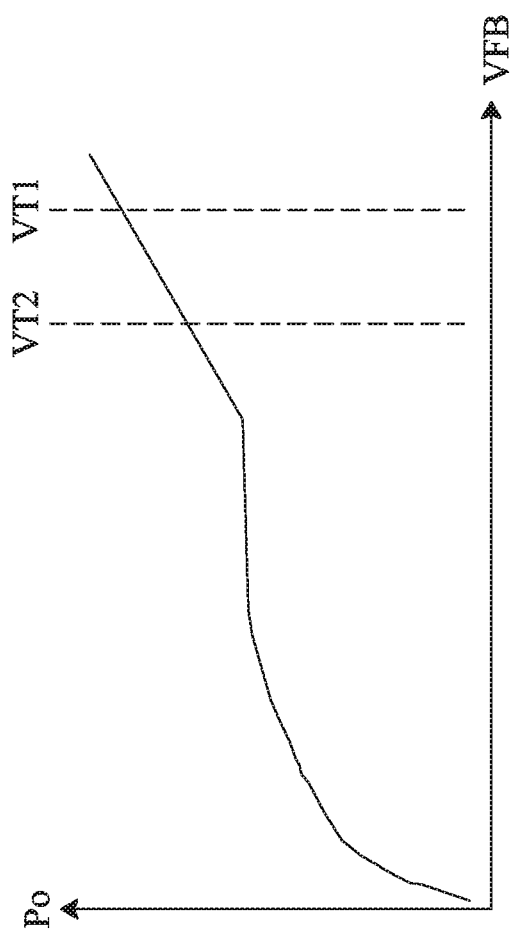
FIG. 5 shows a curve chart of the output power Po versus a feedback voltage VFB.

FIG. 4 shows a first embodiment of the control circuit 16 according to the present invention. In the control circuit 16, a positive input of a comparator 20 is connected to the feedback terminal COMP, and a negative input of a comparator 20 receives a first threshold VT1. The first threshold VT1 is the maximum that limits the input power Po of the power converter. The comparator 20 compares the feedback signal VFB and the first threshold VT1. When the feedback signal VFB is higher than the first threshold VT1, it means that the output power Po is over a tolerance, and a short occurs at the output terminal of the power converter. The comparator 20 generates an off-signal $S_{OFF1}$ so as to turn off the power converter 10. In this embodiment, the feedback voltage VFB is utilized to detect the output power Po. As can be seen from the curve of the output power Po to the feedback voltage VFB shown in FIG. 5, the output power Po and the feedback voltage VFB are in a positive relationship. Thus, the feedback voltage VFB can be used for determining the output power Po.

In FIG. 4, an input terminal of a timer 26 of the overpower protecting circuit 22 is connected to an output terminal of a comparator 24, a positive input of the comparator 24 is connected to the feedback terminal COMP, and a negative input of the comparator 24 receives a second threshold VT2 that is lower than the first threshold VT1. The comparator 24 compares the feedback signal VFB with the second threshold VT2. When the feedback signal VFB is higher than the second threshold VT2, the comparator 24 asserts a comparing signal Sc. Hence the timer 26 counts the pulse width of the comparing signal Sc so as to count a duration time Ts that the feedback signal VFB is higher than the second threshold VT2. When the duration time Ts is higher than a preset time Tth, an abnormal output power Po of the power converter 10 is determined. Accordingly, the timer 26 asserts an off-signal $S_{OFF2}$ to turn off the power converter 10.

The feedback signal VFB is detected to determine whether to generate the off-signals $S_{OFF1}$ and $S_{OFF2}$ or not. In FIG. 3, the capacitor C is able to stabilize a voltage level of the feedback signal VFB, so that the feedback signal VFB will not easily occur a severe variation when the output terminal of the power converter 10 is interfered. That is, it is needless to utilize any extra circuits to prevent the interference from the output terminal. Accordingly, when the output power Po is interfered and a sudden severe variation occurs, the capacitor C keeps the feedback signal VFB stable, so that the timer 26 will not count again. The timer 26 can accurately determine the duration time Ts that the feedback signal VFB keeps higher than the second threshold VT2 so as to turn off the power converter 10 timely.

In the embodiment of FIG. 4, the timer 26 is a digital circuit, which includes an oscillator 28 that generates a clock OSC1 and a counter 30 that is connected to the oscillator 28 and the comparator 24. The counter 30 counts the duration time Ts that the feedback signal VFB keeps being higher than the second threshold VT2 according to the clock OSC1, thereby acquiring a counting value. When the counting value is higher than a preset value, it means that the duration time Ts is higher than the preset time Tth, and the counter 30 asserts the off signal $S_{OFF2}$.

Figure 6:
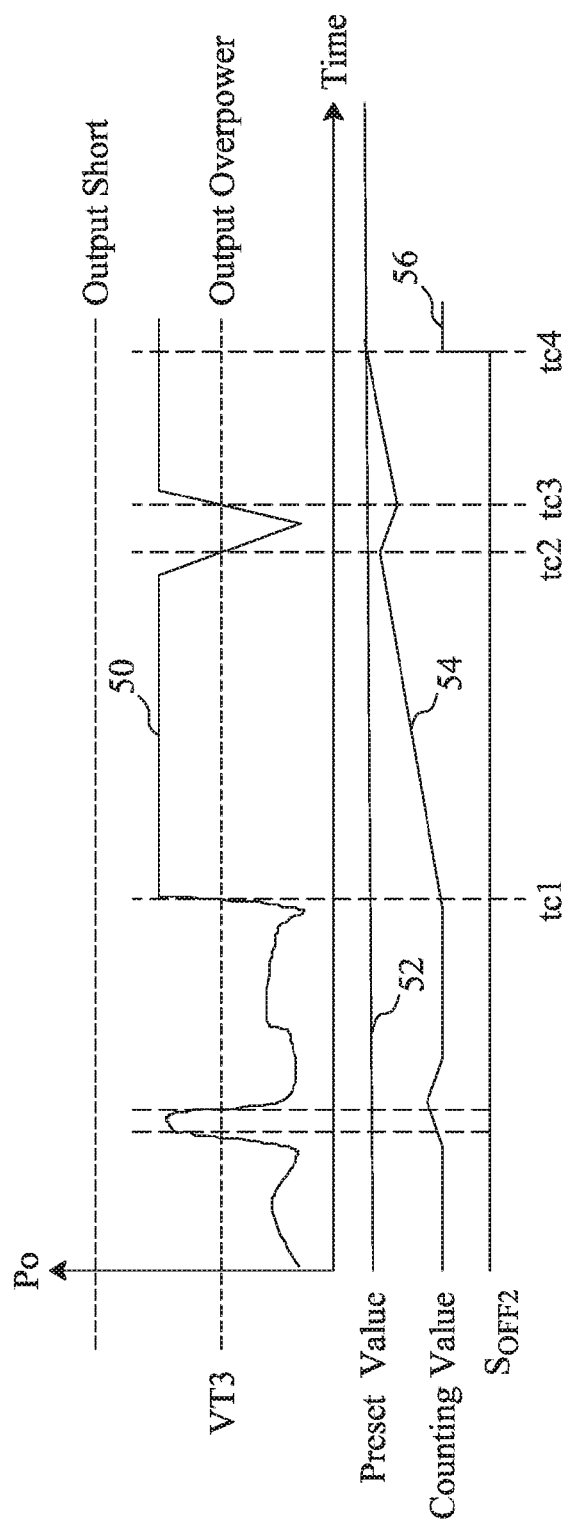
FIG. 6 shows an operation of a timer 30 that is an up-down counter in FIG. 4.

The counter 30 shown in FIG. 4 can be a normal counter or an up-down counter. The general counter increases the counting value when the feedback signal VFB is higher than the second threshold VT2, and resets the counting value when the feedback signal VFB is lower than the second threshold VT2. As to the up-down counter, the counting value increases when the feedback signal VFB is higher than the second threshold VT2, and degreases when the feedback signal VFB is lower than the second threshold VT2. FIG. 6 shows an operation of the up-down counter 30, in which a waveform 50 represents the output power Po, a waveform 52 represents the preset value, a waveform 54 represents the counting value, and a waveform 56 represents the off-signal $S_{OFF2}$. When the output power Po is higher than a threshold VT3, as shown at time tc1, it means that the feedback signal VFB is higher than the second threshold VT2, and the counting value of the counter 30 increases. When the feedback signal VFB keeps being higher than the second threshold VT2, it means that the counting value also increases as shown by the waveform 54 and time tc1 to time tc2. When the counting value reaches the preset value as shown at time tc4, the output power of the power converter 10 is determined as abnormal. Hence the counter 30 asserts the off-signal $S_{OFF2}$ to turn off the power converter 10. When the output power Po is interfered and descends, which causes the feedback signal VFB to be lowered than the second threshold VT2 in a moment as shown by time tc2, the counting value of the counter 30 merely declines a little and it will not be reset. When the interference fades and the output power Po is higher than the threshold as shown at time tc3, the counting value starts rising again. Accordingly, if the up-down counter 30 is adopted, the counting value will almost not be influenced even if the feedback signal VFB is interfered and varies severely. Namely, the critical time of distinguishing the abnormal output power and asserting the off-signal $S_{OFF2}$ will not be influenced easily.

The embodiment shown in FIG. 4 also includes a switch circuit 32 connected to the overpower protecting circuit 22. In the switch circuit 32, a setting terminal S of a flip-flop 34 connects to an output terminal of the oscillator 36, and a reset terminal R of a flip-flop 34 connects to an output terminal of a comparator 38. A positive input of the comparator 38 connects to the feedback terminal COMP, and a negative input thereof connects to the sensing terminal CS. The comparator 38 compares the feedback signal VFB with the sensing signal VCS so as to generate a reset signal $S_{RST}$. The flip-flop 34 generates the control signal CT according to a clock OSC2 provided by the oscillator 36 and the reset signal $S_{RST}$ provided by the comparator 38. A pulse width modulation (PWM) circuit 40 connects to the flip-flop 34, the timer 26, and the comparator 20. The PWM circuit 40 generates a PWM signal Spwm according to the control signal CT. A driving circuit 42 responds to the PWM signal Spwm so as to generate a driving signal VGATE and switch the power switch 14. When the PWM circuit 40 receives the off-signal $S_{OFF1}$ or the off-signal $S_{OFF2}$, the PWM signal Spwm will not be generated, and the power converter 10 will be turned off.

In the embodiment of FIG. 4, the frequency of the driving signal VGATE is determined by the clock OSC2 of the oscillator 36. The clock OSC1, which counts the duration time Ts of the feedback signal VFB being higher than the second threshold VT2, is provided by the oscillator 28. The clock OSC1 and the clock OSC2 are not related to each other. Thus, even if the oscillator 36 decreases the frequency of the clock OSC2 during a light-load mode in order to reduce the switching frequency of the power switch 14, the abnormal output power can be accurately determined and the off-signal $S_{OFF2}$ can be emitted in real time.

Figure 7:
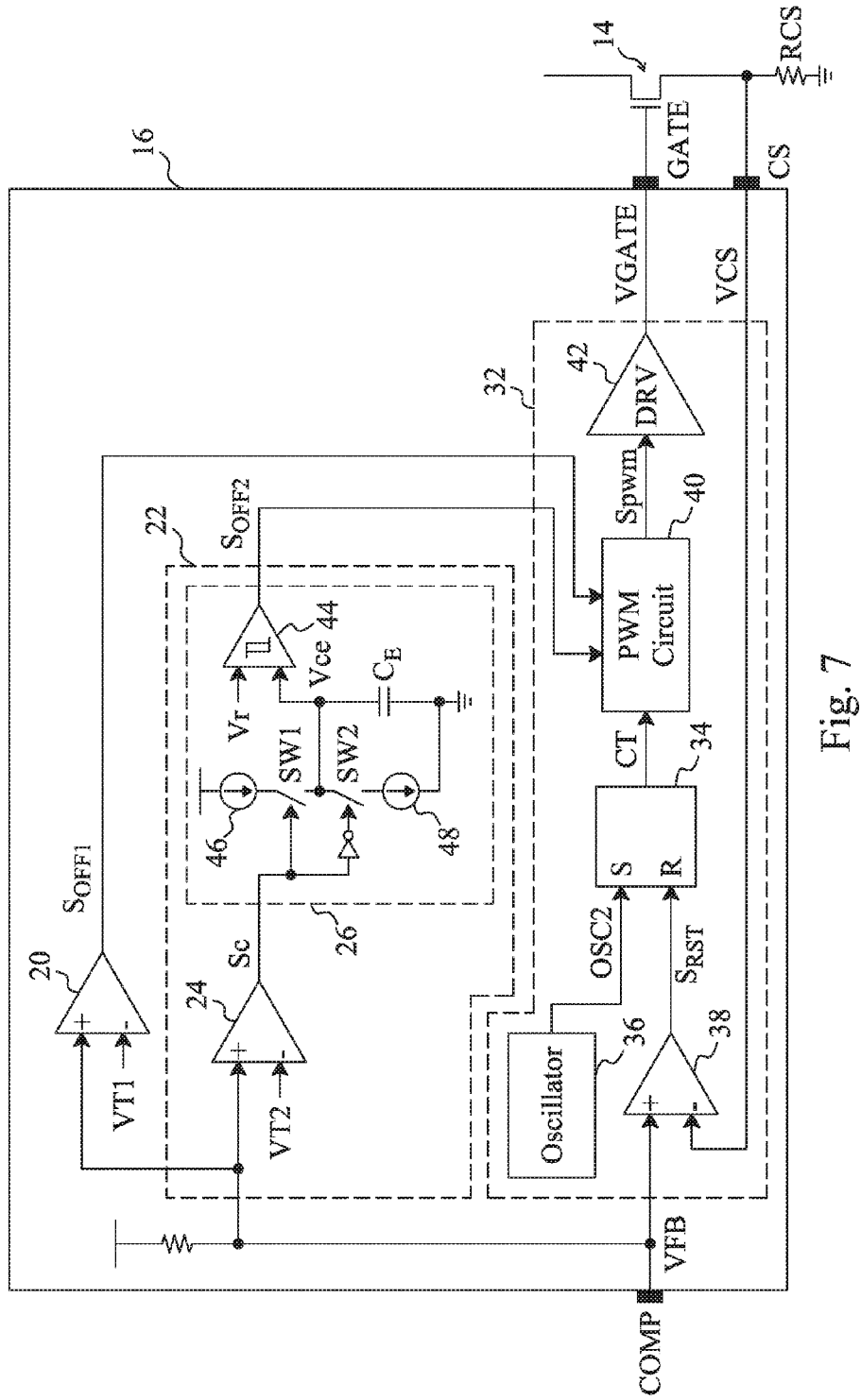
FIG. 7 shows a second embodiment of the present invention.

FIG. 7 shows a second embodiment of the control circuit of the present invention. The timer 26 is different from that of the embodiment in FIG. 4 and it adopts an analog timer. In the timber 26 shown in FIG. 7, a switch SW1 is connected between a current source 46 and a capacitor $C_E$, a switch SW2 is connected between a current source 48 and the capacitor $C_E$, one terminal of the capacitor $C_E$ is connected to ground, and the capacitor $C_E$ is in a parallel connection with the current source 48 and the switch SW2. The comparing signal Sc from the comparator 24 switches the switch SW1 and the switch SW2 so as to charge or discharge the capacitor $C_E$. When the feedback signal VFB is higher than the second threshold VT2, the comparing signal Sc turns on the switch SW1 and turns off the switch SW2, thereby allowing the current source 46 to charge the capacitor $C_E$. Accordingly, the voltage Vce of the capacitor $C_E$ rises. Moreover, a hysteresis comparator 44 compares the voltage Vce of the capacitor $C_E$ with a preset value Vr. When the voltage Vce of the capacitor $C_E$ is higher than the preset value Vr, it means that the duration time Ts of the feedback signal VFB keeps higher than the second threshold VT2 is higher than the preset time Tth, and the hysteresis comparator 44 will assert the off-signal $S_{OFF2}$ so as to turn off the power converter 10. In contrast, when the feedback signal VFB is lower than the second threshold VT2, the comparing signal Sc turns off the switch SW1 and turns on the switch SW2. In the mean time, the current source 48 discharges the capacitor $C_E$ so as to decrease the voltage Vce of the capacitor $C_E$. As shown, the output power Po is interfered and descends severely, so that the feedback signal VFB becomes lower than the second threshold VT2 in a moment. However, the voltage Vce of the capacitor $C_E$ merely decreases a little bit. When the interference vanishes and the output power Po is higher than the threshold again, the voltage of the capacitor $C_E$ rises accordingly. Obviously, even if the feedback VFB varies severely in view of the interference, the time point that the analog timer 26 determines the abnormal output power so as to assert the off-signal $S_{OFF2}$ will not be interfered.

Figure 8:
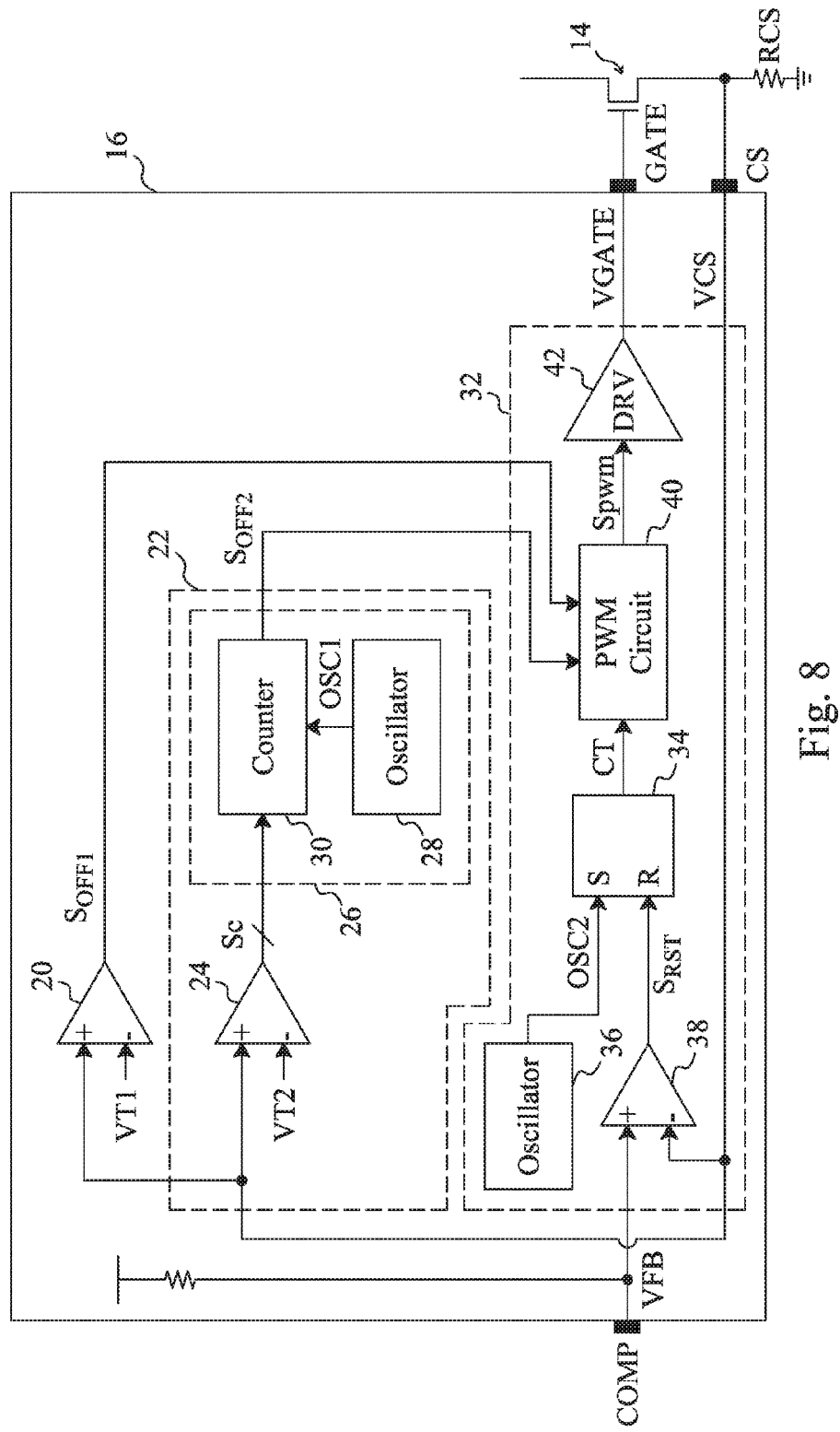
FIG. 8 shows a third embodiment of the present invention.

FIG. 8 shows a third embodiment of the control circuit according to the present invention. Different from the embodiment shown in FIG. 4, the comparator 20 in this embodiment compares the sensing signal VCS with the first threshold VT1, and the comparator 24 compares the sensing signal VCS with the second threshold VT2. When the sensing signal VCS is higher than the first threshold VT1, it means that a short occurs at the output of the power converter, whereby the comparator 20 asserts the off-signal $S_{OFF1}$ so as to turn off the power converter 10. When the sensing signal VCS is higher than the second threshold VT2 and lower than the first threshold VT1, the comparator 24 of the overpower protecting circuit 22 asserts the comparing signal Sc, so that the counter 30 of the timer 26 can count the duration time Ts of the sensing signal VCS being higher than the second threshold VT2. Accordingly, a counting value is generated. When the counting value is higher than a preset value, it means that the duration time Ts is higher than the preset time Tth, and the counter 30 asserts the off-signal $S_{OFF2}$. In the embodiment of FIG. 8, the frequency of the driving signal VGATE is determined by the clock OSC2 of the oscillator 36. Moreover, the clock OSC1 that counts the duration time Ts of the sensing signal VCS being higher than the second threshold VT2 is provided by the oscillator 28. The clocks OSC1 and OSC2 are not related to each other. Namely, even if the frequency of the clock OSC2 is decreased while the oscillator 36 is in the light-load mode for lowering the switching frequency of the power switch 14, the abnormal output power can be still distinguished correctly, and the off-signal $S_{OFF2}$ can be assert timely.

Figure 1:
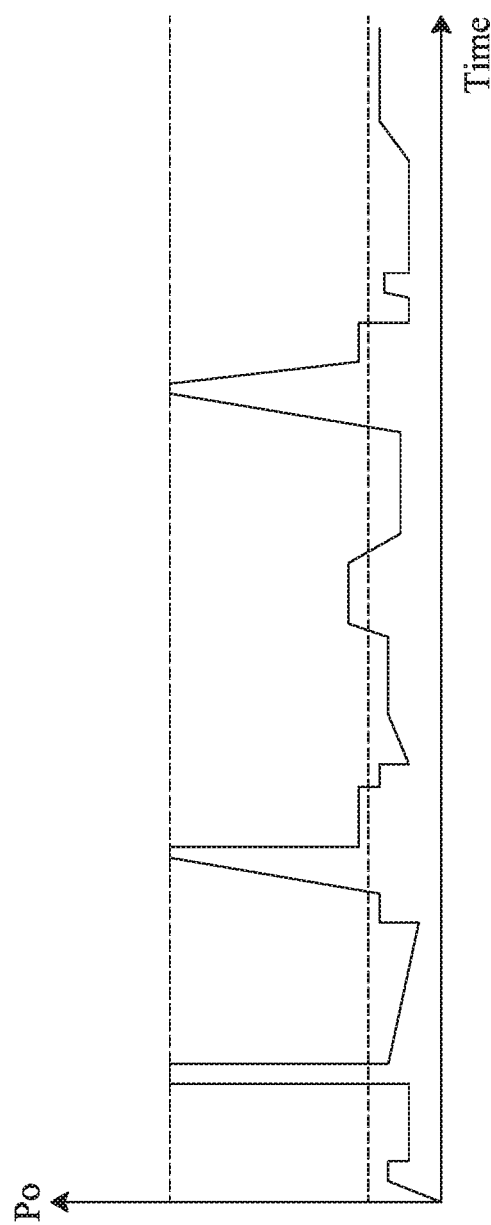
FIG. 1 shows a waveform of an output power of a peak load system.
Figure 2:
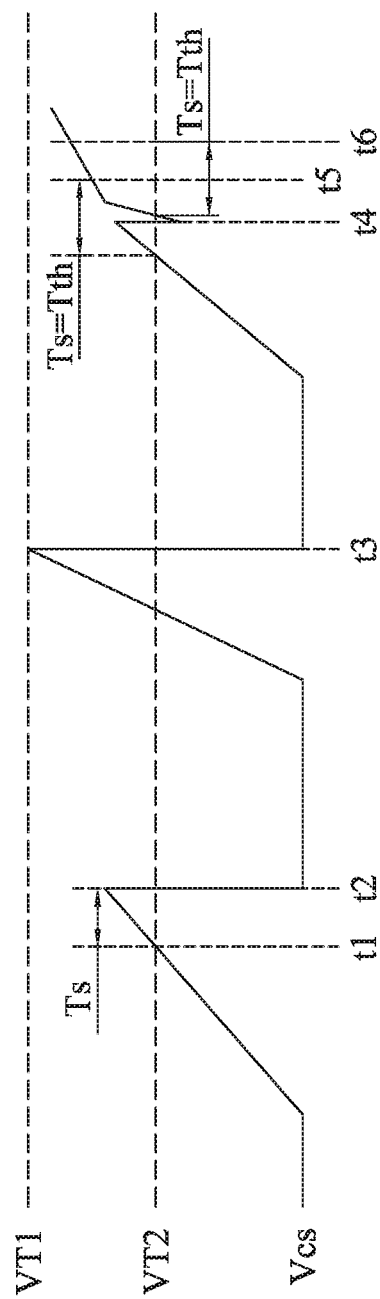
FIG. 2 shows a conventional method for determining an abnormal output power.

The counter 30 shown in FIG. 8 can be a general counter or an up-down counter. A general counter will increase the counting value when the feedback signal VFB is higher than the second threshold VT2 and reset the counting value when the feedback signal VFB is lower than the second threshold VT2. Differently, an up-down counter will increase the counting value when the sensing signal VCS is higher than the second threshold and decrease the counting value when the sensing signal VCS is lower than the second threshold VT2. When the interfered output power Po decreases severely, the sensing signal VCS is lower than the second threshold VT2 as shown at time t4 in FIG. 2. Whereby, the counting value of the up-down counter 30 descends slightly; it will not be reset. When the interference vanishes and the sensing signal VCS is higher than the second threshold VT2 again, the counting value starts rising. As a result, when the counter 30 adopts the up-down counter, the counting value will almost not be interfered even if the sense signal VCS is influenced and varies severely. Namely, the abnormal output power can be correctly determined in real time, and the off-signal $S_{OFF2}$ can be sent accurately.

Figure 9:
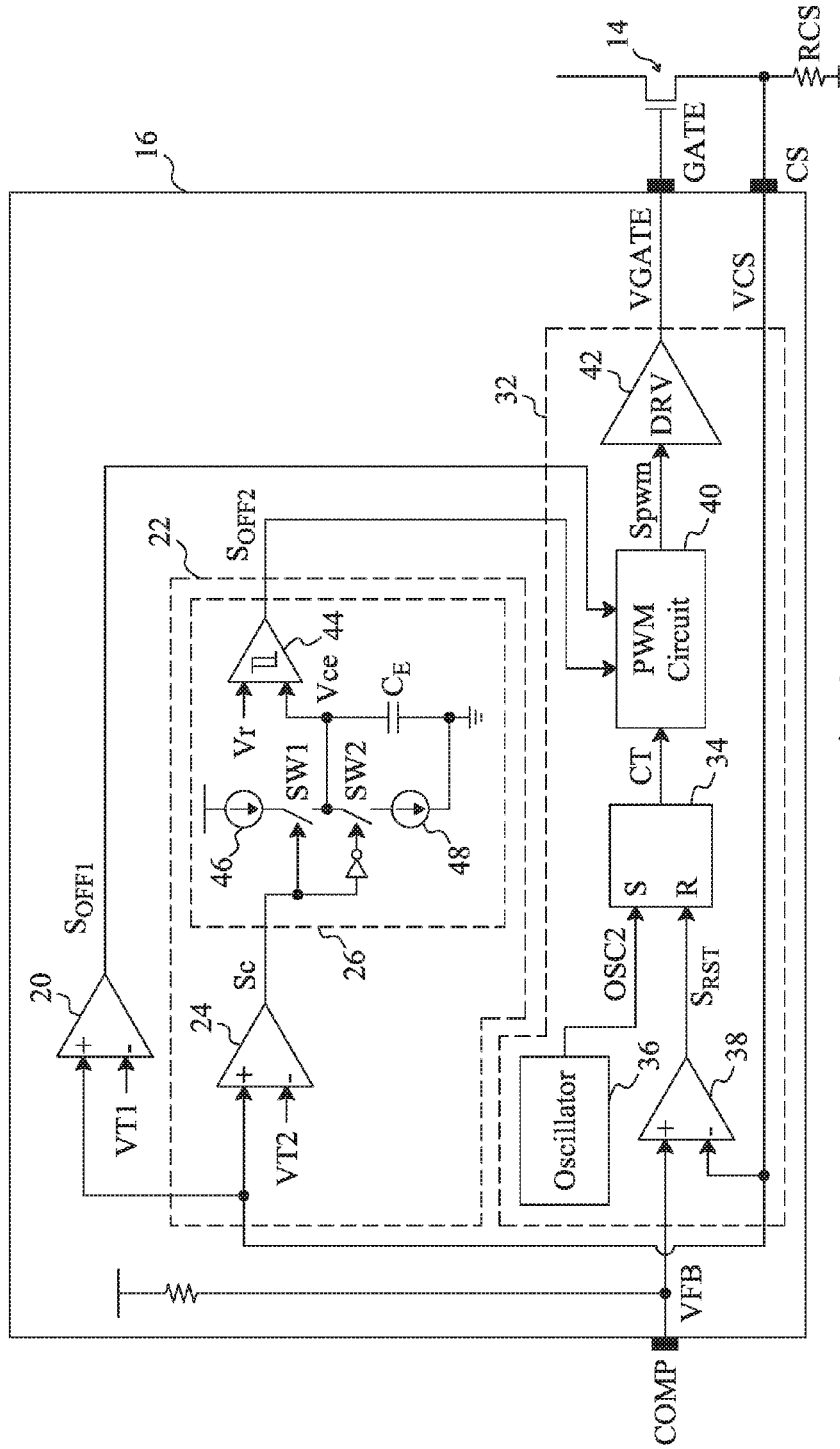
FIG. 9 shows a fourth embodiment of the present invention.

FIG. 9 shows a fourth embodiment of the control circuit 16 according to the present invention. Different from that of the embodiment shown in FIG. 4, the comparator 20 in this embodiment compares the sensing signal VCS with the first threshold VT1, and the comparator 24 compares the sensing signal VCS with the second threshold VT2, and the timer 26 is an analog type. The circuit and the operation of the timer 26 shown in FIG. 9 is the same as those shown in FIG. 7. When the sensing signal VCS is higher than the first threshold VT1, it means that a short occurs to the output of the power converter 10, and the comparator 20 will assert the off-signal $S_{OFF1}$ to turn off the power converter 10. When the sensing signal VCS is higher than the second threshold VT2 and lower than the first threshold VT1, the comparator 24 of the overpower protecting circuit 22 will assert the comparing signal Sc to switch the switches SW1 and SW2 of the timer 26. Thereby, the capacitor $C_E$ will be charged or discharged. When the voltage Vce of the capacitor $C_E$ is higher than a preset value Vr, it means that the duration time Ts of the sensing signal VCS being higher than the second threshold VT2 is higher than the preset time Tth. Hence, the hysteresis comparator 44 will assert the off-signal $S_{OFF2}$ so as to turn off the power converter 10. As shown, the output power Po is interfered and descends severely, so that the sensing signal VCS becomes lower than the second threshold VT2 in a moment. However, the voltage Vce of the capacitor $C_E$ merely decreases a little bit. When the interference vanishes and the output power Po is higher than the threshold again, the voltage of the capacitor $C_E$ rises accordingly. Obviously, the control circuit 16 of the present invention can accurately distinguish the abnormal output power and send the off-signal $S_{OFF2}$ in real time.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control circuit of a power converter using a first capacitor to generate a feedback signal according to a signal related to an output voltage of the power converter, the control circuit comprising:
   a switch circuit generating a driving signal to switch a power switch, for modulating the output voltage, wherein the switch circuit includes a first oscillator providing a first clock to determine a frequency of the driving signal;
   a first comparator connected to the switch circuit, for comparing the feedback signal with a first threshold and asserting a first off-signal to the switch circuit so as to turn off the power converter when the feedback signal is higher than the first threshold; and
   an overpower protecting circuit including:
      a second comparator comparing the feedback signal with a second threshold; and
      a timer connected to the second comparator, for counting a duration time of the feedback signal being higher than the second threshold and asserting a second off-signal to the switch circuit so as to turn off the power converter when the duration time is higher than a preset time;
   wherein the timer comprises:
      a second capacitor;
      a first current source;
      a first switch connected between the second capacitor and the first current source and controlled by an output of the second comparator;
      a second current source;
      a second switch connected between the second capacitor and the second current source and controlled by the output of the second comparator; and
      a hysteresis comparator connected to the second capacitor, for comparing a voltage of the second capacitor with a preset value and asserting the second off-signal when the voltage of the second capacitor is higher than the preset value;
   wherein the first current source charges the second capacitor when the first switch is on, and the second current source discharges the second capacitor when the second switch is on.

2. The control circuit of claim 1, wherein the first switch is turned on and the second switch is turned off when the feedback signal is higher than the second threshold, so as to increase the voltage of the second capacitor, and the first switch is turned off and the second switch is turned on when the feedback signal is lower than the second threshold, so as to decrease the voltage of the second capacitor.

3. The control circuit of claim 1, wherein the switch circuit comprises:
   a third comparator comparing the feedback signal with a sensing signal related to a current that flows through the power switch so as to generate a reset signal;
   a flip-flop having a setting terminal connected to an output terminal of the first oscillator and a reset terminal connected to an output terminal of the third comparator, for generating a control signal according to the first clock and the reset signal;
   a pulse width modulation (PWM) circuit connected to the flip-flop, the timer, and the first comparator, for generating a PWM signal according to the control signal and ceasing the PWM signal when the PWM circuit is receiving the first off-signal or the second off-signal; and
   a driving circuit connected to the PWM circuit responsive to the PWM signal, for generating the driving signal so as to control the power switch.

4. The control circuit of claim 1, wherein the first threshold is higher than the second threshold.

5. A control method of a power converter using a first capacitor to generate a feedback signal according to a signal related to an output voltage of the power converter, the control method comprising the steps of:
   a.) providing a first clock to determine a frequency of a driving signal and switching a power switch according to the driving signal so as to modulate the output voltage;

b.) comparing the feedback signal with a first threshold and asserting a first off-signal when the feedback signal is higher than the first threshold so as to turn off the power converter; and c.) comparing the feedback signal with a second threshold and asserting a second off-signal when a duration time of the feedback signal is being higher than the second threshold being higher than a preset time so as to turn off the power converter;

wherein step c comprises the steps of:
charging a second capacitor when the feedback signal is higher than the second threshold;
discharging the second capacitor when the feedback signal is lower than the second threshold; and
asserting the second off-signal when a voltage of the second capacitor is higher than a preset value.

6. The control method of claim 5, wherein the step a comprises the steps of:
comparing the feedback signal with a sensing signal related to a current that flows through the power switch so as to generate a reset signal;
providing a control signal according to the first clock and the reset signal;
generating a pulse-width-modulation (PWM) signal according to the control signal; and
generating the driving signal responsive to the PWM signal so as to control the power switch.

7. The control method of claim 6, further comprising ceasing to generate the PWM signal by the first off-signal or the second off-signal so as to turn off the power converter.

8. The control method of claim 5, wherein the first threshold is higher than the second threshold.

* * * * *